(12) United States Patent
Brown (10) Patent No.: US 9,987,996 B2
(45) Date of Patent: Jun. 5, 2018

(54) VEHICLE WITH AT LEAST ONE MULTIPURPOSE EQUIPMENT ITEM MOUNTED ON A WINCH AND ASSOCIATED METHODS OF USE

(71) Applicant: The United States of America as represented by the Secretary of the Navy, Washington, DC (US)

(72) Inventor: Christopher A. Brown, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days. days.

(21) Appl. No.: 14/845,210

(22) Filed: Sep. 3, 2015

(65) Prior Publication Data

US 2016/0318741 A1    Nov. 3, 2016

Related U.S. Application Data

(60) Provisional application No. 62/156,101, filed on May 1, 2015.

(51) Int. Cl.
| | |
|---|---|
| *B66D 1/60* | (2006.01) |
| *B60R 9/06* | (2006.01) |
| *B62D 43/00* | (2006.01) |
| *B62D 43/02* | (2006.01) |
| *B66D 3/00* | (2006.01) |

(52) U.S. Cl.
CPC ................ *B60R 9/06* (2013.01); *B62D 43/02* (2013.01)

(58) Field of Classification Search
CPC .......... B66D 1/60; B66D 3/006; B62D 43/02; B62D 43/002; B60R 9/06
USPC ........................................ 414/462, 463, 800
See application file for complete search history.

(56) References Cited

U.S. PATENT DOCUMENTS

| | | | | | |
|---|---|---|---|---|---|
| 1,470,996 | A | * | 10/1923 | McKinley .............. | B62D 43/02 224/42.15 |
| 2,839,232 | A | * | 6/1958 | Homeier ................ | B62D 43/02 224/42.12 |
| 3,012,644 | A | * | 12/1961 | Bush ....................... | E02D 5/803 405/244 |
| 3,056,477 | A | * | 10/1962 | Wooley ................... | B21D 1/08 29/239 |

(Continued)

*Primary Examiner* — Charles A Fox
*Assistant Examiner* — Joseph J. Sadlon
(74) *Attorney, Agent, or Firm* — Christopher A. Monsey (57) ABSTRACT

A vehicle recovery or anchoring system is provided including a winch coupled to a vehicle, a cable retractably disposed in the winch, a selectively removable dual use vehicle component and anchoring structure (DUVCAC), e.g., a spare tire, and a retaining structure that is configured to retract and hold the DUVCAC or extend the same based on operation of the winch. The cable is adapted to selectively couple and decouple with the retaining structure, wherein the cable is passed through a section of the DUVCAC and be drawn against the vehicle and/or winch. Different types of retaining structures are provided including retaining structures that are formed with additional anchoring elements, e.g., folding spades, as well as different structures, e.g., cable sections or loops, to couple with the DUVCAC. Different cable configurations as well as coupling arrangements are also provided. Various methods are also provided.

12 Claims, 8 Drawing Sheets

(56) References Cited

U.S. PATENT DOCUMENTS

| | | | | |
|---|---|---|---|---|
| 3,278,159 A * | 10/1966 | Jack | B62D 57/00 | 180/7.5 |
| 3,734,323 A * | 5/1973 | Price | B62D 43/045 | 414/463 |
| 3,871,142 A * | 3/1975 | Abbott | E02D 5/801 | 52/149 |
| 3,917,094 A * | 11/1975 | Magneson | B60P 3/1008 | 114/372 |
| 4,007,863 A * | 2/1977 | Norris | B62D 43/08 | 211/23 |
| 4,416,402 A * | 11/1983 | Matthew | B62D 43/04 | 224/403 |
| 4,644,712 A * | 2/1987 | Watson | E02D 5/803 | 52/162 |
| 4,840,534 A * | 6/1989 | Totty | B60P 3/125 | 280/402 |
| 5,102,022 A * | 4/1992 | Knezovich | B62D 43/007 | 224/42.24 |
| 5,137,192 A * | 8/1992 | Sheridan | B62D 43/02 | 211/17 |
| 5,560,441 A * | 10/1996 | Moody | B62D 57/00 | 180/7.5 |
| 5,579,973 A * | 12/1996 | Taft | B60R 9/06 | 224/495 |
| 5,639,196 A * | 6/1997 | Murase | B62D 43/10 | 411/349 |
| 5,681,137 A * | 10/1997 | Stallings | B66D 1/04 | 254/323 |
| 6,026,999 A * | 2/2000 | Wakefield | B60R 11/06 | 220/4.22 |
| 6,139,250 A * | 10/2000 | Nolasco | B60P 3/125 | 280/402 |
| 6,564,515 B1 * | 5/2003 | Fontenot | E02D 5/80 | 114/294 |
| 6,681,970 B2 * | 1/2004 | Byrnes | B60R 9/042 | 224/310 |
| 6,739,641 B2 * | 5/2004 | McLeod | B29C 70/467 | 224/42.12 |
| 6,749,094 B1 * | 6/2004 | Dexel | B62D 43/007 | 224/42.24 |
| 7,195,231 B2 * | 3/2007 | Murphy | B62D 43/045 | 224/42.21 |
| 7,478,723 B2 * | 1/2009 | Spater | B62D 43/005 | 206/304.1 |
| 9,049,924 B2 * | 6/2015 | Larimer | A47B 3/0912 | 411/349 |
| 2010/0119342 A1 * | 5/2010 | Russ | B62D 43/045 | 414/463 |
| 2014/0339837 A1 * | 11/2014 | Hermann, III | B66D 1/00 | 293/115 |
| 2016/0121942 A1 * | 5/2016 | Villanueva | B62D 43/10 | 224/42.12 |

* cited by examiner

| Providing a vehicle comprising a frame comprising a load-bearing structure; a winch coupled to the frame and comprising a cable, wherein the winch can lock its rotation up to an application of a first force; wherein the cable comprises a first coupling section, and wherein the cable can retain structural integrity up to an application of the first force; an anchoring structure formed with an aperture therein; a retaining structure formed with a shape that extends over the aperture; and wherein the cable is reversibly coupled with the retaining structure by the cable's first coupling section. | 701 |

↓

| Coupling the cable to the retaining structure by the cable's first coupling section, wherein the cable is passed through the aperture and drawn against the anchoring structure such that the anchoring structure is held fixed against the vehicle. | 703 |

↓

| Extending the cable, decoupling the cable from the retaining structure, and removing the anchoring structure. | 705 |

↓

| Removing a second anchoring structure, securing it to the retainer plate, coupling the cable to said retainer plate, and withdrawing the cable to secure the second anchoring structure against the vehicle. | 707 |

FIG. 16

| Providing a vehicle comprising a frame comprising a load-bearing structure; a winch coupled to the frame and comprising a cable, wherein the winch can lock its rotation up to an application of a first force; wherein the cable comprises a first coupling section, and wherein the cable can retain structural integrity up to an application of the first force; an anchoring structure formed with an aperture therein; a retaining structure formed with a shape that extends over the aperture; and wherein the cable is adapted to selectively couple and decouple with the retaining structure by the cable's first coupling section. | 801 |

↓

| Extending the winch cable and bury the retaining structure and/or anchoring structure in a ground area or couple the retaining structure and/or anchoring structure to a fixed structure. | 803 |

↓

| Retracting the winch cable, thereby moving the vehicle. | 805 |

VEHICLE WITH AT LEAST ONE MULTIPURPOSE EQUIPMENT ITEM MOUNTED ON A WINCH AND ASSOCIATED METHODS OF USE

CROSS-REFERENCE TO RELATED APPLICATION

This application claims priority to U.S. Provisional Patent Application Ser. No. 62/156,101, filed May 1, 2015 (Navy Case 102,261), the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,233) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to a vehicle incorporating a multi-purpose element that permits mounting of a large, heavy item on a vehicle lacking available space or structural strength under stresses of operating environments in existing conventional structures for such large, heavy elements. In one embodiment, an example can include a spare tire mounted on a winch that is mounted on an existing higher strength structure of the vehicle. Embodiments can include examples that can permit the use of such items for multiple uses and can avoid damage to the items in a stored or mounted configuration as well as to the vehicle and mounting structure/system.

Users of vehicles, off-road or all terrain vehicles in particular, frequently have a need to maximize useful load, carrying capacity, and an ability to mount equipment on their vehicles. They also have a need to meet such needs in a way that provides them maximum flexibility and reduces or minimizes interference or incompatibility of load configurations or equipment mounted on such vehicles. Users also seek to provide such benefits in a way that reduces a need for purpose built equipment and vehicles that adds substantial cost to such vehicles as well as related equipment mounted or carried thereon. Users also need to be able to maximize the use of equipment on their vehicles to expand or improve functionality or features that such equipment can provide. Ideally, desired equipment will require the least amount of modifications as well as providing an opportunity to be to repaired and modified in the field. In particular, remote use of such vehicles and items require designs and systems which permit replacement of parts or repair with a wide variety of potential parts or enable an ability to manufacture parts out of available supplies or equipment that are found in austere environments such as in Afghanistan, Antarctica, or Sub-Saharan Africa. Users also have a need for rapid deployment and removal or use of such elements due to environmental considerations such as a hostile environment or conditions which significantly increase difficulty in making use of such items or equipment or even reduce an ability of a user to make use of such equipment e.g., one handed operation, single user operation, etc.

Figure 1:
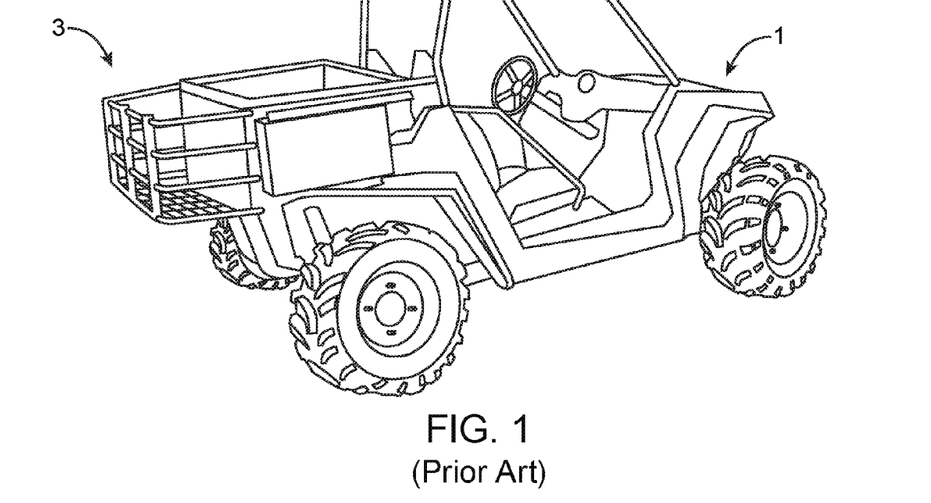
FIG. 1 shows an existing small sized all-terrain vehicle with multiple equipment items and racks without a spare tire.
Figure 2:
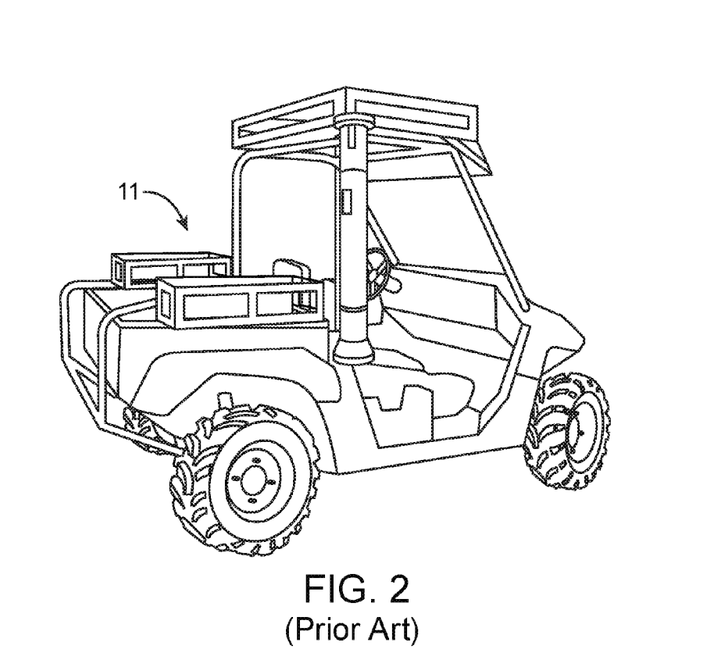
FIG. 2 shows another existing small sized all-terrain vehicle with multiple equipment items and racks mounted on the vehicle without a spare tire.

For example, FIG. 1 shows an existing small sized all-terrain vehicle with multiple equipment items and racks but without a spare tire. FIG. 2 shows another existing small sized all-terrain vehicle with multiple equipment items and racks mounted on the vehicle. In both examples, there is no room for additional items such as a spare tire. In such cases, the vehicle already has equipment on all load-bearing sections; thus additional items cannot be additionally mounted, particularly items which are heavy and large.

In general, a vehicle recovery or anchoring system is provided including a winch coupled to a vehicle, a cable retractably disposed in the winch, a selectively removable dual use vehicle component and anchoring structure (DUVCAC), e.g., a spare tire, and a retaining structure that is configured to retract and hold the DUVCAC or extend the same based on operation of the winch. The cable is adapted to selectively couple and decouple with the retaining structure, wherein the cable is passed through a section of the DUVCAC and be drawn against the vehicle and/or winch. Different types of retaining structures are provided including retaining structures that are formed with additional anchoring elements, e.g., folding spades, as well as different structures, e.g., cable sections or loops, to couple with the DUVCAC. Different cable configurations as well as coupling arrangements are also provided. Various methods are also provided.

In one example, an apparatus and system is provided that permit mounting of heavy and large equipment items using existing structures that do not interference with the existing structure or use of the vehicle or other items or equipment on the vehicle. Some embodiments permit expanded functionality of the existing structures. For example, a winch is mounted on a vehicle front section. The winch is provided with a cable and a retainer structure that fits over a spare tire. The winch cable is passed through the spare tire and coupled to the retainer structure. The winch then retracts the cable and draws the spare tire against the winch and/or surrounding structures and locks the cable in place. Other embodiments include alternate structures as well as those that provide additional functionality and features. Methods of use and manufacturing are also provided.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 16 presents a method of use of an illustrative embodiment of the invention;

FIG. 17 presents another method of use of an illustrative embodiment of the invention;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Referring initially to FIG. 1, an existing small sized all-terrain vehicle 1 with multiple equipment items and racks, including a rear rack 3 mounted on a rear section of the vehicle 1, but without a spare tire, is shown. FIG. 2 shows another existing small sized all-terrain vehicle 11 with multiple equipment items and racks mounted on the vehicle 11 without a spare tire.

Figure 3:
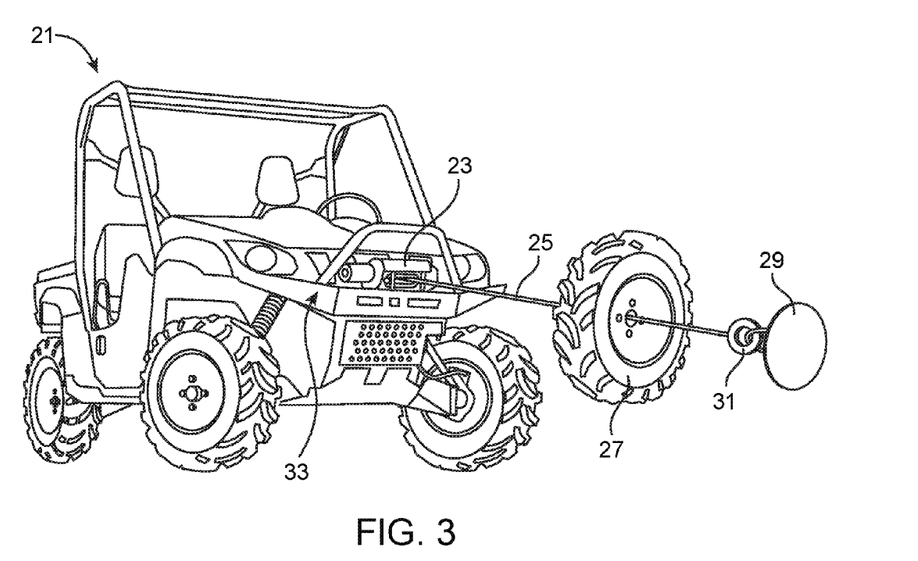
FIG. 3 shows a perspective front view of another small sized all terrain vehicle with an exploded diagram of some elements of one embodiment of the invention.

FIG. 3 shows a perspective front view of another small sized all-terrain vehicle 21 with an exploded diagram of some elements of an embodiment of the invention. A winch 23 is mounted on a bumper 33 of a vehicle 21. A cable 25 runs from the winch 23 through an anchoring structure (e.g., a spare tire) 27 and attaches to a retainer plate or support structure 29 by a selective coupling mechanism 31 adapted to selectively attach or detach from another structure. The selective coupling mechanism 31 could be a variety of adjustable securing structures such as, e.g., a karabiner, structure with moveable latch, or a knot. The winch 23 is capable of locking itself and therefore holding the cable 25 at a desired length up to a first force on the cable.

Figure 4:
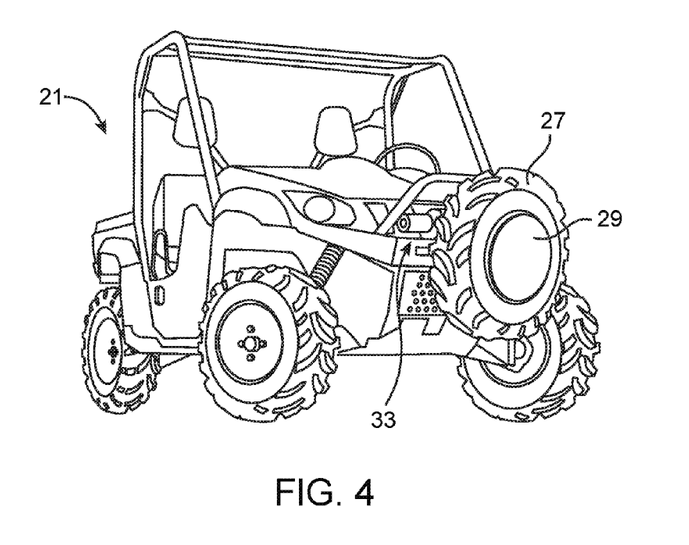
FIG. 4 shows a perspective view of the FIG. 3 vehicle and embodiment in an installed configuration.

FIG. 4 shows a perspective view of the FIG. 3 vehicle 21 and embodiment in an installed configuration with the cable (not shown, see FIG. 3, 25) securely withdrawn and locked around the winch (not shown, see FIG. 3), holding the anchoring structure, e.g. a spare tire 27, tightly between the bumper 33 and retainer plate or support structure 29. Embodiments of the winch 23 can include an electric powered winch as well as a manually operable winch. Embodiments can include a locking mechanism that can be actuated manually or via other means such as an electric solenoid or a friction brake.

Figure 5:
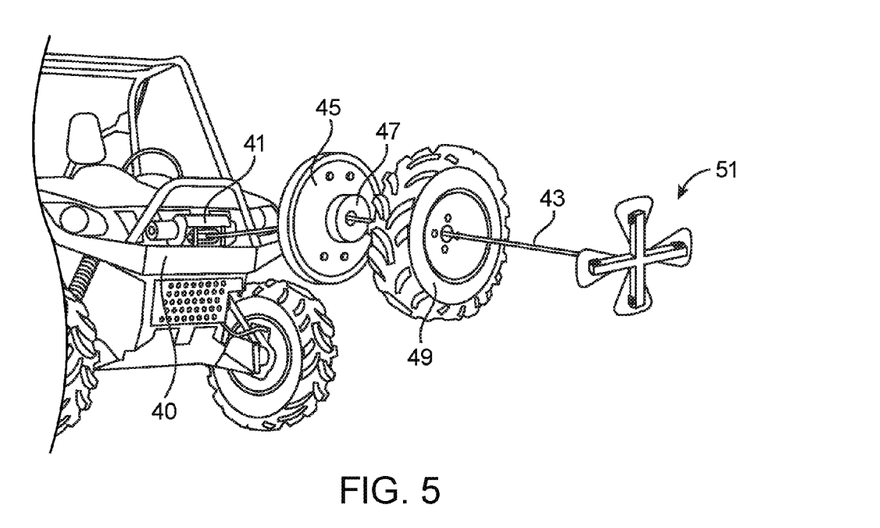
FIG. 5 shows a perspective exploded view of another embodiment of the invention with a vehicle.

FIG. 5 shows a perspective front view of an exploded diagram of an alternative embodiment of the invention with a mounting guide and support structure for an anchoring structure 45. In this embodiment, again a winch 41 is mounted on a bumper 40. From the winch 41 runs a cable 43 that passes through the mounting guide and support structure 45 in a cable aperture 47 and the anchoring structure, e.g. a spare tire 49, before connecting to an expandable anchoring structure 51 by a selective coupling mechanism (not shown, however, e.g., see FIG. 3). In this embodiment, the anchoring structure, e.g. a spare tire 49, is secured between the expandable anchoring structure 51 and the mounting guide and support structure 45 by withdrawing and tightening the cable 43 around the winch 41 that is capable of locking itself and, therefore, holding the cable 43 at a fixed distance for up to a first force on the cable 43.

Figure 6:
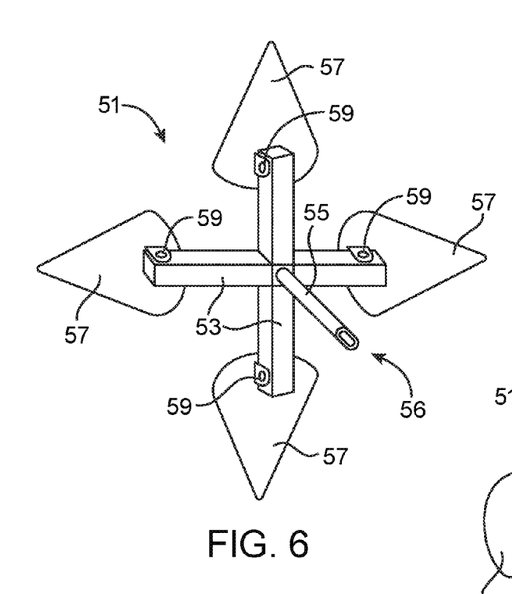
FIG. 6 shows a perspective view of an embodiment of one component of an embodiment of the invention, a tire anchor, in the "open" position to be used with the embodiment of FIG. 5.

FIG. 6 shows a perspective view of an embodiment of the expandable anchoring structure 51, a "tire anchor," that is shown in the above embodiment featured in FIG. 5. In this embodiment, the expandable anchoring structure 51 comprises a cross-shaped structure 53 formed with a plurality of elongate structures, four in this case, which extend from a center section in a first plane with each other. The elongate structures 53 in this embodiment are formed at a 90 degree angle with respect to each other. The expandable anchoring structure 51 also has a shank 55 coupled to the center section of the cross-shaped structure on one end and extending perpendicular to the cross-shaped structure's first plane. The shank 55 is formed with an eyelet or ring structure 56 that is adapted to engage with or couple with a selective coupling mechanism of a cable of a winch (not shown, see FIG. 3, 31). The cross-shaped structure 53 terminate in spade-like moveable petal or fluke structures 57 that connect to the cross-shaped structure 53 by hinges 59 that allow the moveable petal or fluke structures 57 to rotate between a stowed position resting on opposite faces of the cross shaped structure 53 and an extended position which can be approximately 180 degrees from the stowed position. The moveable petal or fluke structures can also include locking mechanisms that lock the structures in the stowed or extended position. Such locking mechanisms can include a locking pin that can be inserted or removed manually or an automatic latching mechanism which can include a spring loaded pin or spherical structure that has a retaining mechanism to keep the pin or spherical structure in position but permits it to depress until it engages into a hole or indentation in a portion in proximity to the moveable petal or fluke structure hinge or rotation structure. In this figure, the petal or fluke structures 57 are shown in an "open" position with them resting on the face opposite the shank 55 and with their tips pointing outwards. One advantage of moveable positioning of the petal or fluke structures 57 includes enabling the expandable anchoring structure 51 to be engaged or dig into the ground (see FIG. 17).

Figure 7:
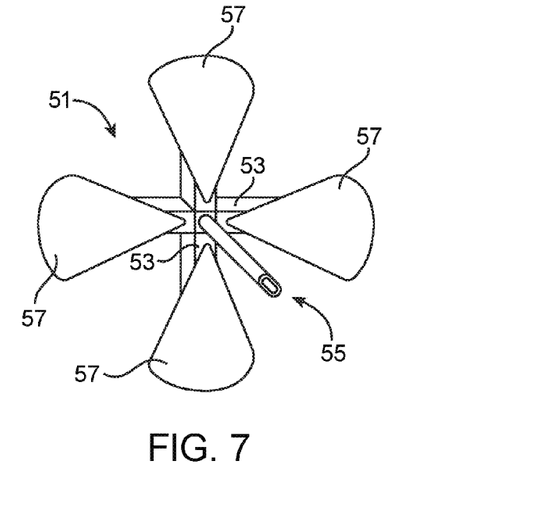
FIG. 7 shows a perspective view of the same embodiment of the tire anchor of FIG. 6 but in the "closed" position.

FIG. 7 shows an alternative embodiment of the FIG. 6 embodiment but in a "closed" position with the moveable petal or fluke structures 57 rotated inwardly over the cross shaped structure 53 in the stowed position described above.

In some embodiments, the cross-shaped structure 53 may also be formed with telescoping elements (e.g., segments which fit inside other segments that permit extension of elements of the cross-shaped structure). In some embodiments, the hinges 59 may be spring-loaded to permit the expandable anchoring structure's moveable petal or fluke structures 57 to be biased into the extended position or alternatively in the stowed position.

Figures 8, 9, 10, 11:
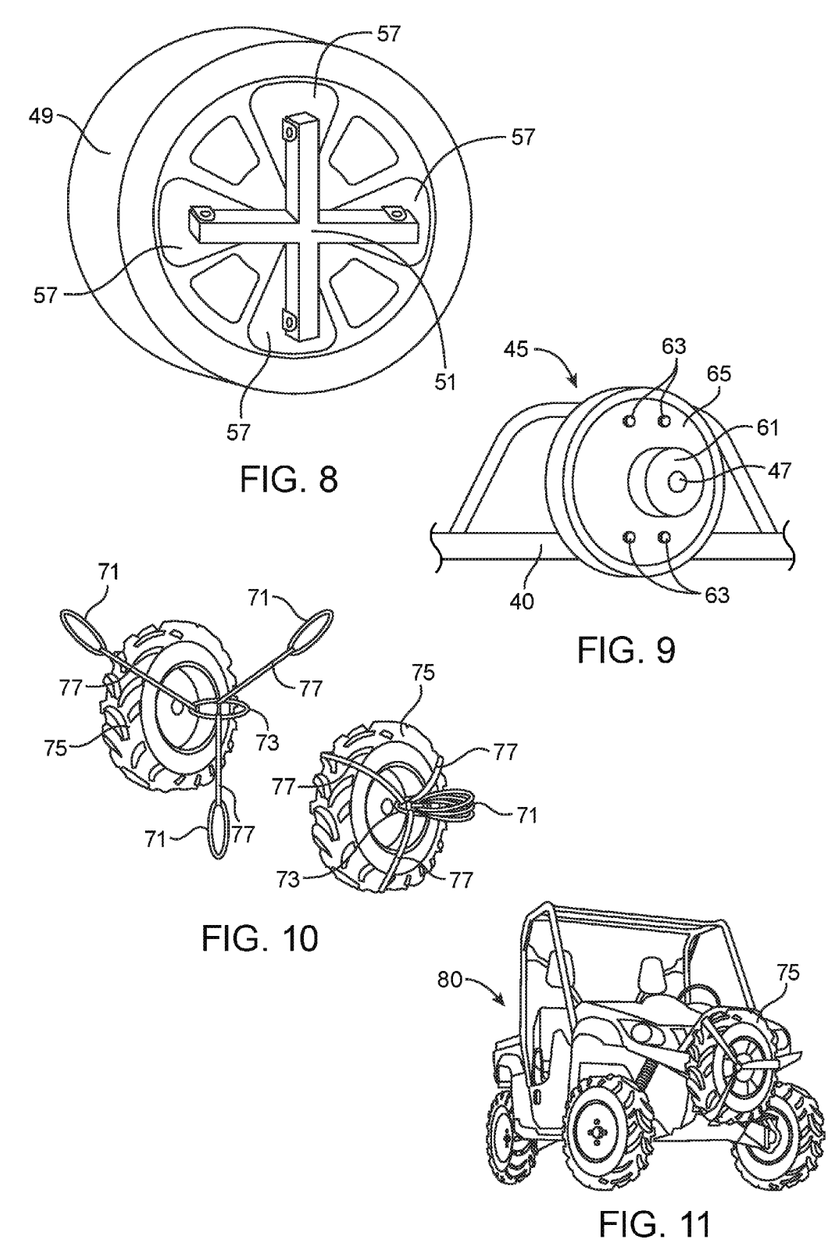
FIG. 8 shows a perspective view of the same embodiment of the tire anchor of FIG. 6 fitted into an exemplary anchoring structure, e.g. a tire.
FIG. 9 shows a perspective view of an embodiment of a component of an embodiment, a mounting guide and support structure, to be used with the embodiment of FIG. 5.
FIG. 10 shows a perspective view of a spare tire and mounting or retention straps/coupling rings or connectors for another embodiment of the invention.
FIG. 11 shows the FIG. 8 embodiment installed on a small sized all terrain vehicle.

FIG. 8 shows the above embodiment of the expandable anchoring structure 51 shown in FIGS. 6 and 7 fitted into an anchoring structure, e.g., a spare tire 49. To fit the expandable anchoring structure 51 into the anchoring structure, e.g. a spare tire 49, the moveable petal or fluke structures 57 are rotated into the stowed or "closed" position as shown in FIG. 7. Then the shank 55 (not shown, see FIG. 6 and FIG. 7) is inserted through a middle of an opening of the anchoring structure, e.g. a spare tire 49.

FIG. 9 shows an embodiment of a mounting guide and support structure 45 for guiding into position, mounting, and holding an exemplary anchoring structure (not shown, but see, e.g., FIGS. 5-8). Mounted on a bumper 40, the mounting guide and support structure for an anchoring structure 45 comprises a back plate 65 and an anchoring structure support structure 61 through which runs a cable aperture 47. The back plate 65 is secured to the bumper 40 via a tertiary connecting system 63 that is capable of securing the mounting guide and support structure for an anchoring structure 45 to the bumper 40 up a second force. The tertiary connecting system 63 can comprise bolts, screws, or cable ties.

FIG. 10 shows a perspective view of an anchoring structure, e.g., spare tire 75, and mounting or retention straps 77 with coupling rings or connectors 71 for another embodiment of the invention. In particular, instead of a retainer plate or structure (not shown, see FIG. 3 and FIG. 4), straps 77 with rings 71 are provided that are attached on one end to a central connecter 73, e.g., a ring, that is positioned in a center section of the anchoring structure, e.g., spare tire 75, with the straps radially wrapping around the anchoring structure and coupling on a back end with the central connecter 73, e.g., a ring. Another embodiment can have adjustment straps or quick release coupling straps that apply tension to the straps. FIG. 11 shows the FIG. 10 embodiment installed on a small sized all-terrain vehicle 80 that has a winch (not shown) and a winch cable (not shown) where the winch cable is attached on one end to the rings (not shown, see FIG. 10) on either side of the anchoring structure, e.g. spare tire 75, before the winch cable is retracted into the winch so as to position the anchoring structure against the winch or the vehicle in a fixed position relative to the vehicle 80.

An alternative configuration can include a coupling structure with a threaded end and an eyelet on an opposing end configured to couple with a cable coupled to a winch mounted on a vehicle where a wing nut or another manually interactive structure engages by means of a threaded structure with the threaded end of the coupling structure so as to draw the anchoring structure, e.g. a spare tire, and the anchoring structure retainer plate or structure towards the winch and maintain the anchoring structure in a fixed relationship with respect to the vehicle. The anchoring structure retainer plate or structure is formed or configured in various ways including having a diameter that fits within a rim of a spare tire, within the rim but not extending beyond a central section of the rim, surrounding an aperture in a center section of the rim that is defined by a recess surrounded by holes configured to receive threaded wheel lug studs, or over the rim and onto an inner section of the spare tire itself. The anchoring structure retainer plate or structure can also be configured with a gap that permits a coupling section to pass through the gap in one orientation and lock in place in a rotated configuration.

Another configuration of an anchoring structure retainer plate or structure can include one with a gap that permits a winch cable to be passed through the gap where the cable has a winch cable coupling structure such as a hook or ring that is large enough to prevent the winch cable coupling structure from passing through the gap in the anchoring structure retainer plate or structure. The winch is configured to be able to retract the cable that is passed through a center aperture of the anchoring structure, e.g., a spare tire's rim, and such that the winch draws the anchoring structure retainer plate or structure and the anchoring structure, e.g., a spare tire, up against the winch or a frame or bumper section that is coupled to the winch so as to hold the anchoring structure, e.g., spare tire, in a fixed relationship with respect to the frame or bumper. An embodiment can include a winch mounted to a vehicle such that the winch holds the cable in the locking configuration of the winch so as to ensure the anchoring structure, e.g., spare tire, does not contact a plane that is defined by, e.g., a section of the vehicle's tires or ground engaging members that is farthest away from the vehicle's axles that the tires are mounted on and has a predetermined clearance from the plane.

Figure 12:
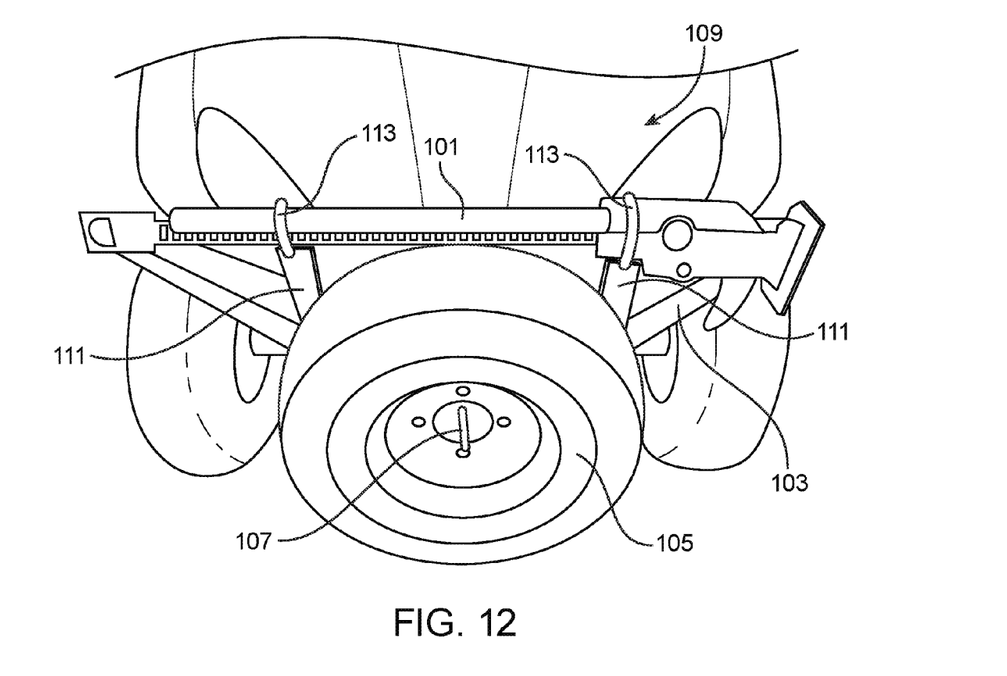
FIG. 12 shows another embodiment of the invention with additional arm structures to support the mounting of a second item.

Additional embodiments can also enable mounting of multiple other items in proximity or in relation to an embodiment of the invention such as axes, weapons, shovels, spare tire jacks, tools, etc, as shown in FIG. 12. In these additional embodiments, a winch (not shown) again secures an anchoring structure 105, such as a spare tire, between a retainer plate or an attaching mechanism 107 and a bumper or structural frame 103 that may also couple to said winch (not shown) and/or the vehicle 109. In this embodiment, as well as in similar embodiments, the bumper or structural frame 103 may be fitted with additional arm structures 111 that secure a second item 101 in a position relative to said anchoring structure 105 as between said anchoring structure 105 and said vehicle 109. Said second item, such as a jack, ax, or shovel, can be secured to the additional arm structures 111 by a variety of retaining structures 113, such as clamps or textile hook and loop fasteners.

Figure 13:
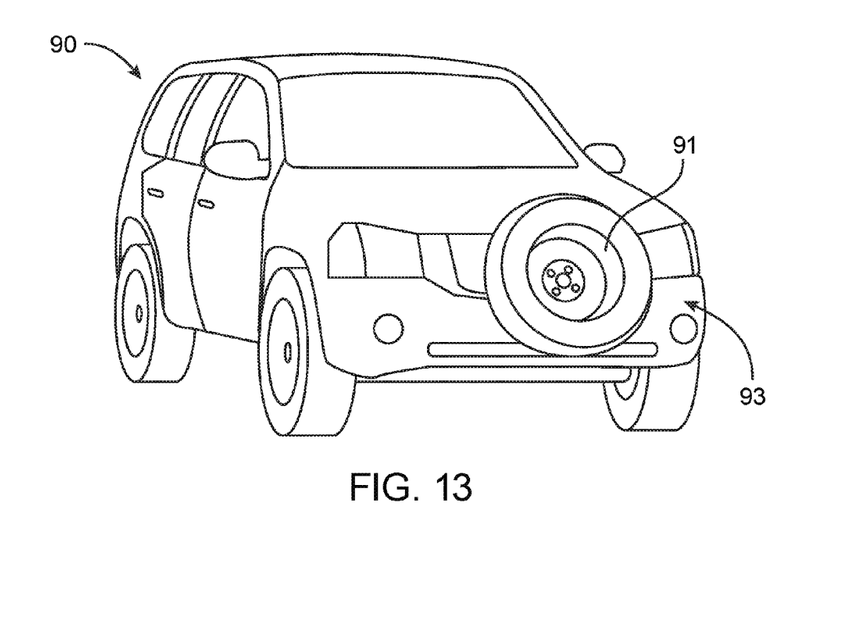
FIG. 13 shows a front perspective view of a modified commercial sport utility vehicle with one embodiment of the invention mounted on the vehicle.

FIG. 13 shows a front perspective view of a modified commercial sport utility vehicle 90 with one embodiment of the invention mounted on the vehicle 90. In this configuration, an anchoring structure, e.g., spare tire 91, is drawn up against a bumper 93 where a winch (not visible) is mounted on a frame section (not visible) where a cable (not shown) coupled to the winch passes through the bumper 93. Additional embodiments can include a control unit in proximity to the winch that includes a locking mechanism.

Figure 14:
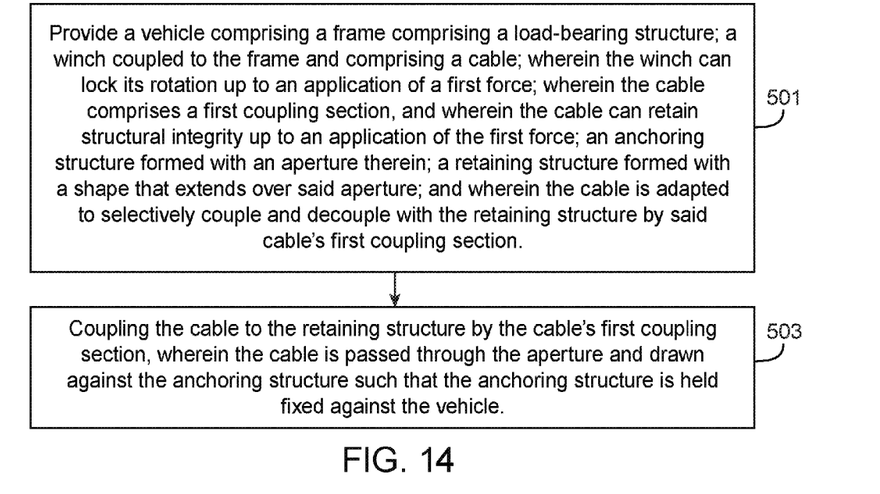
FIG. 14 presents a method of manufacturing illustrative embodiments of the invention.

FIG. 14 shows a method of manufacturing an embodiment of the invention. In Step 501, provide a vehicle comprising a frame comprising a load-bearing structure; a winch coupled to the frame and comprising a cable; wherein the winch can lock its rotation up to an application of a first force; wherein the cable comprises a first coupling section, and wherein the cable can retain structural integrity up to an application of the first force; an anchoring structure formed with an aperture therein; a retaining structure formed with a shape that extends over said aperture; and wherein the cable is adapted to selectively couple and decouple with the retaining structure by said cable's first coupling section. Then in Step 503, couple the cable to the retaining structure by the cable's first coupling section, wherein the cable is passed through the aperture and drawn against the anchoring structure such that the anchoring structure is held fixed against the vehicle.

Figure 15:
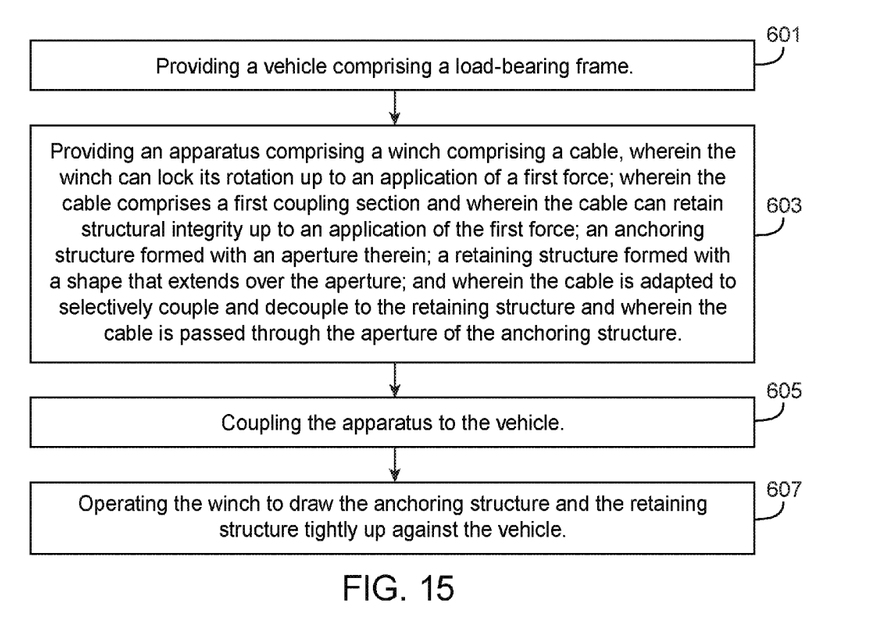
FIG. 15 presents an alternative method of manufacturing illustrative embodiments of the invention.

FIG. 15 provides another method of manufacturing of one embodiment of the invention. In Step 601, providing a vehicle comprising a load-bearing frame. Next in Step 603, provide an apparatus comprising a winch comprising a cable, wherein the winch can lock its rotation up to an application of a first force; wherein the cable comprises a first coupling section and wherein the cable can retain structural integrity up to an application of the first force; an anchoring structure formed with an aperture therein; a retaining structure formed with a shape that extends over the aperture; and wherein the cable is adapted to selectively couple and decouple to the retaining structure and wherein the cable is passed through the aperture of the anchoring structure. Then in Step 605, couple the apparatus to the vehicle. Finally in Step 607, operate the winch to draw the anchoring structure and the retaining structure tightly up against the vehicle.

FIG. 16 shows a method of using an embodiment of the invention. First in Step 701, provide a vehicle comprising a frame comprising a load-bearing structure; a winch coupled to the frame and comprising a cable, wherein the winch can lock its rotation up to an application of a first force; wherein the cable comprises a first coupling section, and wherein the cable can retain structural integrity up to an application of the first force; an anchoring structure formed with an aperture therein; a retaining structure formed with a shape that extends over the aperture; and wherein the cable is reversibly coupled with the retaining structure by the cable's first coupling section. Then in Step 703, couple the cable to the retaining structure by the cable's first coupling section, wherein the cable is passed through the aperture and drawn against the anchoring structure such that the anchoring structure is held fixed against the vehicle. Next in Step 705, extend the cable, decouple the cable from the retaining structure, and remove the anchoring structure. Finally in Step 707, remove a second anchoring structure, secure it to the retainer plate, couple the cable to said retainer plate, and withdraw the cable to secure the second anchoring structure against the vehicle.

FIG. 17 shows another method of use for an embodiment of the invention in a vehicle recovery operation. First in Step 801, provide a vehicle comprising a frame comprising a load-bearing structure; a winch coupled to the frame and comprising a cable, wherein the winch can lock its rotation up to an application of a first force; wherein the cable comprises a first coupling section, and wherein the cable can retain structural integrity up to an application of the first force; an anchoring structure formed with an aperture therein; a retaining structure formed with a shape that extends over the aperture; and wherein the cable is adapted to selectively couple and decouple with the retaining structure by the cable's first coupling section. Then in Step 803, extend the winch cable and bury the retaining structure and/or anchoring structure in a ground area or couple the retaining structure and/or anchoring structure to a fixed structure. Finally in Step 805, retract the winch cable, thereby moving the vehicle.

Figure 18:
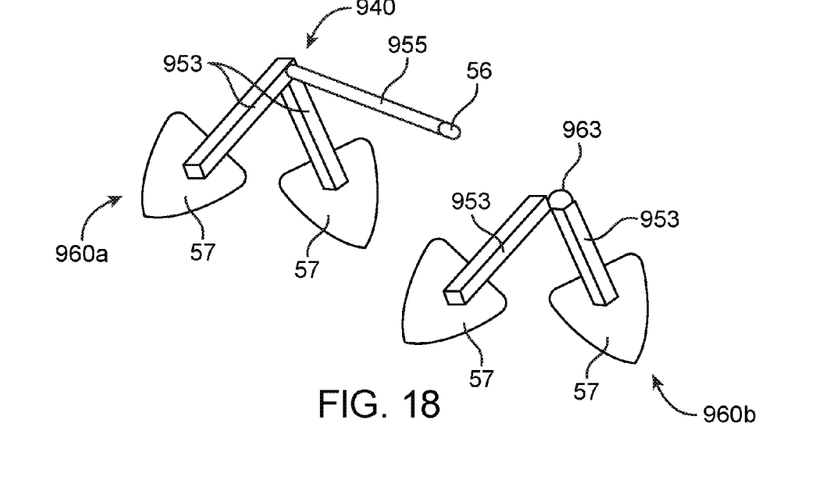
FIG. 18 shows an exploded perspective view of an alternative embodiment of the invention.
Figure 20:
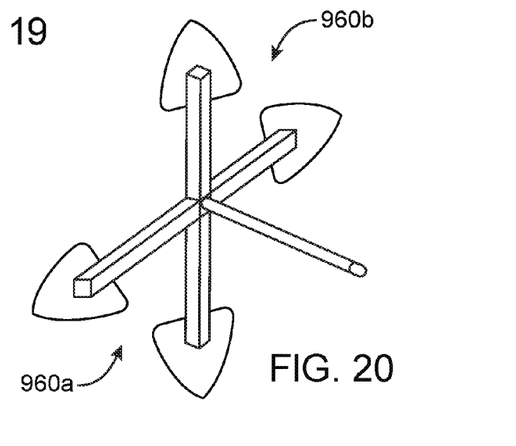
FIG. 20 shows a perspective view of the same embodiment of FIG. 18 but in an alternate arrangement.

FIG. 18 depicts an exploded perspective view of an alternative embodiment of the expandable tire anchor described above. In this embodiment, the expandable tire anchor can detach into two separate components. Component 960a comprises structural beams 953 that terminate in petal or fluke structures 57, as well as a shank 955 that extends outward orthogonally from a plane defined by the structural beams' 953 construction, wherein the shank 955 further comprises and terminates in an eyelet or ring structure 56. At the intersection of the structural beams 953 a secondary selective coupling mechanism 940 is present to allow for an arrangement of the apparatus as shown in FIG. 20. Component 960b comprises structural beams 953 that terminate in petal or fluke structures 57. At the intersection of the structural beams 953, a loop-like attaching mechanism 963 is present. The loop-like attaching mechanism is adapted to fit over the eyelet or ring structure 56 of the shank 955 of component 960a to secure component 960b on the shank 955 a set distance from the structural beams 953 of component 960a. Shank 955 may further comprise of a groove (not shown) to complement the fit of component 960b. Component 960a and component 960b may also further comprise hinges (not shown, see FIG. 6, 59) to allow for the rotation of the petal or fluke structures between opposite faces of the structural beams 953.

Figure 19:
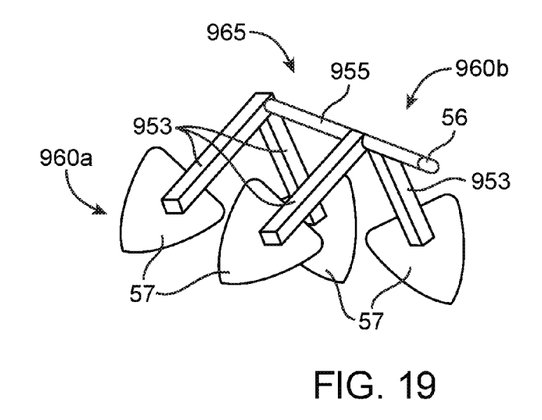
FIG. 19 shows a perspective view of the same embodiment of a tire anchor as FIG. 18.

FIG. 19 depicts a perspective view of the embodiment of FIG. 18 fitted together. Visible are structural beams 953 and petal or fluke structures 57 of components 960a and 960b. Also visible is a shank 955 that terminates in an eyelet or ring structure 56. The distance 965 along the shank 955 between structural beams 953 of component 960a and 960b may be used to house an anchoring structure, e.g. a spare tire (not shown, see FIG. 5, 49). In this embodiment's use as a "land anchor (see FIG. 17), the petal or fluke structures 57 can be buried in a ground area to provide a better foundation and to prevent tipping.

FIG. 20 shows a perspective view of the same embodiment of FIG. 18 reassembled in a manner very similar to the embodiment of FIG. 6. In the FIG. 20 embodiment, components 960a and 960b are fitted together by attaching the loop-like attaching mechanism (not shown, see FIG. 18, 963) of component 960b into the secondary selective coupling mechanism (not shown, see FIG. 18, 940) of component 960a. In this configuration, the apparatus may be used in a manner like that of FIG. 5, 51.

Although the invention has been described in detail with reference to certain preferred embodiments, variations and modifications exist within the spirit and scope of the invention as described and defined in the following claims.

The invention claimed is:

1. A vehicle comprising:
   a frame having a first and second end, said frame comprising a first load-bearing structure coupled to said vehicle and a plurality of wheels coupled to said frame with a rotational direction oriented along a first axis, wherein said first and second end are on opposing sides of said frame along said first axis;
   a winch adapted to pull said vehicle along said first axis comprising a cable, wherein said cable is at least 10 feet in length, said winch is coupled to said frame or said first load bearing structure on either said first or second end, said winch is oriented to extend or retract said cable along the first axis extending away from said first or second end, wherein said winch comprises a locking mechanism or braking system configured to lock or brake the winch's rotation up to an application of a first force, wherein said cable comprises a first coupling section including a coupler, latch, clasp, or selective fastener, wherein said cable and said first coupling section are configured to retain structural integrity up to an application of said first force;
   a first item comprising a vehicle tire mounting rim and a tire mounted on said rim that is formed so it is interchangeable with any one of plurality of said wheels, said first item is formed with a first aperture therein that is formed into a first side of said first item or passes through said first side of said first item and a second side of said first item that opposes said first side of said first item, said first item is formed with at least one laterally extending structure radially extending away from said first aperture, wherein said first item is further formed with a rim or outer section that surrounds a recessed plate structure which is coupled to the rim or outer section in which the first aperture is formed, the rim or outer section is further formed with opposing spaced apart rim edge flanges adapted to engage with and mount an inner bead section of the tire; and a retaining structure formed with a shape that extends over or is configured to selectively engage or couple with said first item at, within, or around said first aperture on at least said first side of said first item, wherein an outer section of said retaining structure is selectively positioned over or drawn at least partially within said rim as said cable retracts and presses said retaining structure into said first item and against said vehicle or frame;

a first item mounting guide and support structure that comprises a protrusion that fits into a portion of said first item over and against an area around said aperture, said first item mounting guide and support further comprises a second aperture that is configured to permit said cable to run through, wherein said first mounting guide and support structure is pressed against said frame, first load bearing structure, or it is configured to be pulled against said winch when said first item is retracted towards said winch by said cable, wherein said first item mounting guide and support structure is configured to retain structural integrity up to an application of a second force, wherein said second force is at least 200 pounds;

wherein said cable is adapted to selectively couple and decouple with the retaining structure by said cable's first coupling section, wherein said cable's first coupling section selectively couples with said retaining with or without passing through said first aperture;

wherein said retaining structure is configured to be selectively drawn against said first item such that said first item is selectively held fixed against said winch, frame, first load bearing structure, or vehicle;

wherein the retaining structure further comprises:
a plurality of protrusions extending away from a vertex coupling point, each said plurality of protrusions having a terminal end on an opposing end from said vertex coupling point;
a shank comprising a first and second end, wherein said first end terminates in an eyelet or ring structure designed to receive said first coupling section and wherein said second end is coupled to and extends away from said vertex coupling point of said retaining structure on a first side of said retaining structure;
a plurality of hinges coupled at said terminal ends of each said plurality of protrusions; and
a plurality of plates respectively coupled to each of said plurality of hinges, wherein said hinges and plates are configured to enable said plates to rotate between a first and second position along an arc at or between 170 degrees to 220 degrees along said hinge's rotation axis, said first position orients said plates towards said vertex coupling point on a second side of said retaining structure opposing said first side of said retaining structure over said first item and said second position orients said plates away from said vertex coupling point;
wherein the plurality of protrusions are formed into a cross-shaped support structures and are further formed comprising one or more telescoping sections adapted to extend said telescoping sections away from said vertex coupling point, wherein said hinges are spring-loaded and each further comprise a release mechanism coupled to one or more release latches, wherein said plurality of protrusions are formed to retain structural integrity up to application of said first and second force.

2. The vehicle as in claim 1, wherein said cable's first coupling section comprises a karabiner comprising said latch section coupled to said karabiner body with a pivot coupler and a locking section on opposing ends of said latch section, wherein said karabiner is formed or configured to retain structural integrity up to the application of said first force.

3. The vehicle as in claim 1, further comprising additional arm structure supports coupled to said winch or to said frame around said winch that terminate in secondary attaching mechanisms designed to receive a third item and hold said third item in a location between said first item and said winch.

4. The vehicle as in claim 3, wherein said secondary attaching mechanisms comprise clamps or textile hook and loop fasteners, wherein said third item is a jack, an axe, or a shovel.

5. A vehicle comprising:
a frame having a first and second end, said frame comprising a first load-bearing structure coupled to said vehicle and a plurality of wheels coupled to said frame with a rotational direction oriented along a first axis, wherein said first and second end are on opposing sides of said frame along said first axis;
a winch adapted to pull said vehicle along said first axis comprising a cable, wherein said cable is at least 10 feet in length, said winch is coupled to said frame or said first load bearing structure on either said first or second end, said winch is oriented to extend or retract said cable along the first axis extending away from said first or second end, wherein said winch comprises a locking mechanism or braking system configured to lock or brake the winch's rotation up to an application of a first force, wherein said cable comprises a first coupling section including a coupler, latch, clasp, or selective fastener, wherein said cable and said first coupling section are configured to retain structural integrity up to an application of said first force;
a first item comprising a vehicle tire mounting rim and a tire mounted on said rim that is formed so it is interchangeable with any one of plurality of said wheels, said first item is formed with a first aperture therein that is formed into a first side of said first item or passes through said first side of said first item and a second side of said first item that opposes said first side of said first item, said first item is formed with at least one laterally extending structure radially extending away from said first aperture, wherein said first item is further formed with a rim or outer section that surrounds a recessed plate structure which is coupled to the rim or outer section in which the first aperture is formed, the rim or outer section is further formed with opposing spaced apart rim edge flanges adapted to engage with and mount an inner bead section of the tire; and a retaining structure formed with a shape that extends over or is configured to selectively engage or couple with said first item at, within, or around said first aperture on at least said first side of said first item, wherein an outer section of said retaining structure is selectively positioned over or drawn at least partially within said rim as said cable retracts and presses said retaining structure into said first item and against said vehicle or frame; a first item mounting guide and support structure that comprises a protrusion that fits into a portion of said first item over and against an area around said aperture, said first item mounting guide and support further comprises a second aperture that is configured to permit said cable to run through, wherein said first mounting guide and support structure is pressed against said frame, first load bearing structure, or it is configured to be pulled against said winch when said first item is retracted towards said winch by said cable, wherein said first item mounting guide and support structure is configured to retain structural integrity up to an application of a second force, wherein said second force is at least 200 pounds;

wherein the cable is adapted to selectively couple and decouple with the retaining structure by said cable's first coupling section, wherein said cable's first coupling section selectively couples with said retaining with or without passing through said first aperture;

wherein the retaining structure is configured to be selectively drawn against said first item such that said first item is selectively held fixed against said winch, frame, first load bearing structure, or vehicle;

wherein said retaining structure comprises a shank and more than one retaining structure sections, wherein each retainer structure section connects at a base area of said shank at a vertex coupling section of said base area of shank by a secondary selective coupling mechanism, wherein said secondary selective coupling mechanism comprises a loop adapted to fit over said shank, wherein said shank further comprises at least one groove adapted to engage with said loop of said secondary selective attaching mechanism attaching mechanism.

6. A vehicle comprising a frame having a first and second end, said frame comprising a first load-bearing structure coupled to said vehicle and a plurality of wheels coupled to said frame with a rotational direction oriented along a first axis, wherein said first and second end are on opposing sides of said frame along said first axis;

a winch adapted to pull said vehicle along said first axis comprising a cable, wherein said cable is at least 10 feet in length, said winch is coupled to said frame or said first load bearing structure on either said first or second end, said winch is oriented to extend or retract said cable along the first axis extending away from said first or second end, wherein said winch comprises a locking mechanism or braking system configured to lock or brake the winch's rotation up to an application of a first force, wherein said cable comprises a first coupling section including a coupler, latch, clasp, or selective fastener, wherein said cable and said first coupling section are configured to retain structural integrity up to an application of said first force;

a first item comprising a vehicle tire mounting rim and a tire mounted on said rim that is formed so it is interchangeable with any one of plurality of said wheels, said first item is formed with a first aperture therein that is formed into a first side of said first item or passes through said first side of said first item and a second side of said first item that opposes said first side of said first item, said first item is formed with at least one laterally extending structure radially extending away from said first aperture, wherein said first item is further formed with a rim or outer section that surrounds a recessed plate structure which is coupled to the rim or outer section in which the first aperture is formed, the rim or outer section is further formed with opposing spaced apart rim edge flanges adapted to engage with and mount an inner bead section of the tire; and a retaining structure formed with a shape that extends over or is configured to selectively engage or couple with said first item at, within, or around said first aperture on at least said first side of said first item, wherein an outer section of said retaining structure is selectively positioned over or drawn at least partially within said rim as said cable retracts and presses said retaining structure into said first item and against said vehicle or frame;

a first item mounting guide and support structure that comprises a protrusion that fits into a portion of said first item over and against an area around said aperture, said first item mounting guide and support further comprises a second aperture that is configured to permit said cable to run through, wherein said first mounting guide and support structure is pressed against said frame, first load bearing structure, or it is configured to be pulled against said winch when said first item is retracted towards said winch by said cable, wherein said first item mounting guide and support structure is configured to retain structural integrity up to an application of a second force, wherein said second force is at least 200 pounds;

wherein the cable is adapted to selectively couple and decouple with the retaining structure by said cable's first coupling section, wherein said cable's first coupling section selectively couples with said retaining with or without passing through said first aperture;

wherein the retaining structure is configured to be selectively drawn against said first item such that said first item is selectively held fixed against said winch, frame, first load bearing structure, or vehicle;

wherein said retainer structure further comprises:
 a central ring, designed to receive said first coupling section and can maintain structural integrity up to an application of said first and second force; and
 a plurality of straps all coupled to said central ring at a first end wherein a second end of each said strap terminates in supplementary rings and wherein said straps and said supplementary rings are configured or formed of materials that retain structural integrity up to an application of said first and second force.

7. A method for performing a vehicle recovery operation comprising:

providing a vehicle comprising:
 a frame having a first and second end, said frame comprising a load-bearing structure coupled to said vehicle and a plurality of wheels coupled to said frame with a rotational direction oriented along a first axis, wherein said first and second end are on opposing sides of said frame along said first axis;
 a winch adapted to pull said vehicle along said first axis comprising a cable coupled to said frame or load bearing structure on either said first or second end and is oriented to extend or retract said cable along the first axis extending away from said first or second end, wherein said winch further comprises a brake section configured to lock or brake the winch and prevent winch rotation up to an application of a first force;

wherein said cable comprises a first coupling section, and wherein said cable and first coupling section is formed or made to retain structural integrity up to an application of said first force; and a first item comprising a vehicle tire mounting rim and a tire mounted on said rim that is formed so it is interchangeable with any one of plurality of said wheels formed with a first aperture therein, said first item is formed with a section that extends away from said first aperture, wherein said first item is further formed with a rim or outer section that surrounds a recessed plate structure which is coupled to the rim or outer section in which the first aperture is formed therein, the rim or outer section is further formed with opposing spaced apart rim edge flanges adapted to engage with and mount an inner bead section of the tire;

a retaining structure formed with a shape that is formed to extend over said first aperture, wherein an outer section of said retaining structure is selectively positioned over or drawn at least partially within said rim as said cable retracts and presses said retaining structure into said first item and against said vehicle or frame;

a first item mounting guide and support structure that comprises a protrusion that fits into a portion of said first item over and against an area around said aperture, said first item mounting guide and support further comprises a second aperture that is configured to permit said cable to run through, wherein said first mounting guide and support structure is pressed against said frame, first load bearing structure, or it is configured to be pulled against said winch when said first item is retracted towards said winch by said cable, wherein said first item mounting guide and support structure is configured to retain structural integrity up to an application of a second force, wherein said second force is at least 200 pounds;

wherein said cable is adapted to selectively couple and decouple with the retaining structure by said cable's first coupling section, wherein said cable is passed through said first aperture and drawn against said first item such that said first item is held fixed against said vehicle, frame or load bearing structure;

wherein the retaining structure further comprises:
  a plurality of protrusions extending away from a vertex coupling point, each said plurality of protrusions having a terminal end on an opposing end from said vertex coupling point;
  a shank comprising a first and second end, wherein said first end terminates in an eyelet or ring structure designed to receive said first coupling section and wherein said second end is coupled to and extends away from said vertex coupling point of said retaining structure on a first side of said retaining structure;
  a plurality of hinges coupled at said terminal ends of each said plurality of protrusions; and
  a plurality of plates respectively coupled to each of said plurality of hinges, wherein said hinges and plates are configured to enable said plates to rotate between a first and second position along an arc at or between 170 degrees to 220 degrees along said hinge's rotation axis, said first position orients said plates towards said vertex coupling point on a second side of said retaining structure opposing said first side of said retaining structure over said first item and said second position orients said plates away from said vertex coupling point;
  wherein the plurality of protrusions are formed into a cross-shaped support structures and are further formed comprising one or more telescoping sections adapted to extend said telescoping sections away from said vertex coupling point, wherein said hinges are spring-loaded and each further comprise a release mechanism coupled to one or more release latches, wherein said plurality of protrusions are formed to retain structural integrity up to application of said first and second force extending said winch cable, disposing at least a portion of said retaining structure and said first item into a ground area comprising soil a first distance then extending the plates to the second position and embedding at least a portion of the retaining structure into the ground; and retracting said cable with said winch and thereby moving said vehicle towards said ground area or said fixed structure;

wherein said first force is equal to or greater than 2000 pounds.

8. The method as in claim 7, wherein said cable's first coupling section comprises a karabiner comprising said latch section coupled to said karabiner body with a pivot coupler and a locking section on opposing ends of said latch section, wherein said karabiner is formed or configured to retain structural integrity up to the application of said first force.

9. The method as in claim 7, wherein said retaining structure couples to said first coupling section of said cable by engaging threaded structures of both said retaining structure and said first coupling section and wherein said engaged threaded structures are capable of retaining structural integrity up to an application of said first and second force.

10. The method as in claim 7, wherein, said aperture is formed as a first aperture therein that is formed into a first side of said first item or passes through said first side of said first item and a second side of said first item that opposes said first side of said first item.

11. The method as in claim 10, further comprising additional arm structure supports coupled to said winch or to said frame around said winch that terminate in secondary attaching mechanisms designed to receive a third item and hold said third item in a location between said first item and said winch, wherein said secondary attaching mechanisms comprise clamps, wherein said secondary attaching mechanisms comprise textile hook and loop fasteners, wherein said third item is a jack, an axe, or a shovel.

12. A method for performing a vehicle recovery operation comprising:

providing a vehicle comprising:
  a frame having a first and second end, said frame comprising a load-bearing structure coupled to said vehicle and a plurality of wheels coupled to said frame with a rotational direction oriented along a first axis, wherein said first and second end are on opposing sides of said frame along said first axis;
  a winch adapted to pull said vehicle along said first axis comprising a cable coupled to said frame or load bearing structure on either said first or second end and is oriented to extend or retract said cable along the first axis extending away from said first or second end, wherein said winch further comprises a brake section configured to lock or brake the winch and prevent winch rotation up to an application of a first force;

wherein said cable comprises a first coupling section, and wherein said cable and first coupling section is formed or made to retain structural integrity up to an application of said first force; and a first item comprising a vehicle tire mounting rim and a tire mounted on said rim that is formed so it is interchangeable with any one of plurality of said wheels formed with a first aperture therein, said first item is formed with a section that extends away from said first aperture, wherein said first item is further formed with a rim or outer section that surrounds a recessed plate structure which is coupled to the rim or outer section in which the first aperture is formed therein, the rim or outer section is further formed with opposing spaced apart rim edge flanges adapted to engage with and mount an inner bead section of the tire;

a retaining structure formed with a shape that is formed to extend over said first aperture, wherein an outer section of said retaining structure is selectively positioned over or drawn at least partially within said rim as said cable retracts and presses said retaining structure into said first item and against said vehicle or frame;

a first item mounting guide and support structure that comprises a protrusion that fits into a portion of said first item over and against an area around said aperture, said first item mounting guide and support further comprises a second aperture that is configured to permit said cable to run through, wherein said first mounting guide and support structure is pressed against said frame, first load bearing structure, or it is configured to be pulled against said winch when said first item is retracted towards said winch by said cable, wherein said first item mounting guide and support structure is configured to retain structural integrity up to an application of a second force, wherein said second force is at least 200 pounds;

wherein said cable is adapted to selectively couple and decouple with the retaining structure by said cable's first coupling section, wherein said cable is passed through said first aperture and drawn against said first item such that said first item is held fixed against said vehicle, frame or load bearing structure;

wherein said retainer structure comprises:
   a central ring, designed to receive said first coupling section and can maintain structural integrity up to an application of said first and second force; and
   a plurality of straps all coupled to said central ring at a first end wherein a second end of each said strap terminates in supplementary rings and wherein said straps and said supplementary rings are configured or formed of materials that retain structural integrity up to an application of said first and second force;

extending said winch cable, disposing at least a portion of said retaining structure and said first item into a ground area comprising soil a first distance then extending the plates to the second position and embedding at least a portion of the retaining structure into the ground; and retracting said cable with said winch and thereby moving said vehicle towards said ground area;

wherein said first force is equal to or greater than 2000 pounds.

* * * * *